United States Patent [19]
Muller

[11] 3,712,294
[45] Jan. 23, 1973

[54] METHOD AND APPARATUS FOR MEASURING HUMAN REACTION

[76] Inventor: John T. Muller, 50 West Lawn Road, Livingston Township, Essex County, N.J. 07039

[22] Filed: July 24, 1970

[21] Appl. No.: 58,078

[52] U.S. Cl. ....................128/2 N, 73/65, 73/141 A, 128/2 S

[51] Int. Cl. ..........................................A61b 5/10

[58] Field of Search...........128/2 S, 2 N, 2 R, 2.05 B; 73/379, 65, 141 A

[56] References Cited

UNITED STATES PATENTS

| | | | |
|---|---|---|---|
| 3,090,226 | 5/1963 | Corti et al. | 73/141 A |
| 3,076,452 | 2/1963 | Rothe | 128/2.05 B |
| 3,178,938 | 4/1965 | Ruge | 73/141 A |
| 3,237,450 | 3/1966 | Brooks, Jr. | 73/141 A |
| 2.095,268 | 10/1937 | Roberts | 128/25 |
| 3,504,540 | 4/1970 | Pradko et al. | 73/141 A |
| 3,398,581 | 8/1968 | DeLucia | 73/379 |
| 3,370,296 | 2/1968 | Greenberg | 73/379 X |

FOREIGN PATENTS OR APPLICATIONS

| | | | |
|---|---|---|---|
| 1,118,715 | 3/1956 | France | 128/2 S |
| 1,918,521 | 10/1969 | Germany | 128/2 S |
| 6,706,516 | 11/1967 | Netherlands | 128/2 S |

*Primary Examiner*—Kyle L. Howell
*Attorney*—Roger A. Clapp

[57] ABSTRACT

Method and Apparatus for measuring human reaction wherein the test apparatus comprises a platform for supporting a person being tested, a support, a rod mounted vertically between the platform and the support, sensors for detecting deflections of the rod and a display device for recording the output of the sensors.

10 Claims, 3 Drawing Figures

15
12
11
A
B
13
C
D
2
2

INVENTOR
JOHN T. MULLER
BY
ATTORNEY

METHOD AND APPARATUS FOR MEASURING HUMAN REACTION

FIELD OF THE INVENTION

This invention relates to the measurement of human responses and pertains in particular to the measurement of the magnitude and rate of human reaction.

BACKGROUND OF THE INVENTION

The need for measuring human reaction arises in many areas, but it is particularly acute in the field of law enforcement. Specifically, police officers are constantly on the alert against motorists whose reactions are impaired sufficiently to jeopardize traffic safety. Heretofore, however, it has been difficult if not impossible to obtain inexpensive yet accurate measurements.

Accordingly, a specific object of this invention is to facilitate detection of motorists whose reactions are impaired.

Once made, measurements of human reaction can be exceptionally useful if preservable as a permanent record. For example, a chronological series of such measurements would produce a pattern which could be used to detect variations in muscular response, occurring in an individual over a period of time. Furthermore, if individual patterns are collected, profile groups can be established which would represent various standards or levels of physical ability.

Accordingly, another object of this invention is to achieve, simply and conveniently, a record of human reaction in permanent form.

Most broadly, however, the ability to obtain such data accurately and easily would enable researchers to conduct wide ranging investigations in the field of nervous control of muscular response.

Accordingly, it is broadly an object of this invention to achieve accurate and easy measurements of human reaction.

SUMMARY OF THE INVENTION

According to a preferred embodiment of this invention, simple, inexpensive and accurate measurements of human reactions are achieved by locating the center of gravity of a test subject in a predetermined position with respect to a reference axis and then recording the rate and magnitude by which the alignment between the center of gravity and the reference axis changes.

According to one feature of this invention, accurate and convenient measurements are achieved in permanent form by combining a column, a platform, sensors and a display device. MOre specifically, the column is mounted as a cantilever, the platform is mounted on the free end of the column so as to support a test subject with his center of gravity in a predetermined position with respect to the axis of the column, the sensors are disposed around the periphery of the column and generate outputs when the column deflects in response to changes in the location of the center of gravity of the test subject and the display device is connected to the sensors and contains mechanisms to record and display their outputs.

In accordance with another feature of this invention, accurate measurement of the magnitude and rate of movement of the center of gravity of a test subject is achieved by mounting the strain gauges symmetrically around the periphery of the column.

In accordance with another feature of this invention, quick and convenient display and recording of the magnitude and rate of test subject movement is achieved by attaching an $x$–$y$ recorder to the outputs of the strain gauges.

A better understanding of these and other objects and features of this invention will be facilitated by the following detailed description when taken in conjunction with the drawing.

DETAILED DESCRIPTION

The continuous effort to maintain an up-right position in most living beings is an example of the coordination of the nervous control and the muscular response. When the nervous system ceases to operate, a complete physical collapse occurs in the living body. In other words, it not only fails to remain upright, but it also fails to maintain its physical shape. The number of muscles involved which are necessary to maintain the normal physical shape are numerous. Each muscle must deliver the correct amount of operating force to maintain proper relative position with respect to a vertical axis. All muscles must operate with the proper coordination of every other muscle in the body, creating an operating system with fantastic feedback problems. The nervous system is the sensing system which produces this coordination and has a center which directs all operations. The efficiency of this system is astonishing.

Every body regardless of its shape, has a center of gravity which is a ficticious center through which all forces must pass which operate on the body. For a human being to remain upright, his center of gravity must be in the middle of the area on which he stands. When it does, his condition is stable. The moment that his center of gravity is no longer above the middle of the supporting area, however, an unstable condition arises. Consequently, if no corrective action is taken, a rapid change in the physical status will take place. A normal human being will maintain his center of gravity within a radius of one centimeter of the stable condition. Therefore, the slightest malfunction in the operation and coordination of the nervous system will have an immediate affect on the maintenance of the center of gravity within its prescribed area.

There is a time delay between the perception of unbalance (center of gravity deviating from its geometric center) and the corrective motor action of the muscular system. Unbalance is progressive and is observed as an increasing displacement of the center of gravity mark. The object of the muscular correction is to decrease this displacement and reduce it to zero. It is obvious that the longer it takes to initiate the correction, the greater the displacement of the recorded center of gravity mark.

That time delay is one mechanism used by this invention to achieve the desired results. In the following paragraphs, an embodiment is disclosed which is especially suitable for use by law enforcement officers. Basically, however. the data which is generated can be used for a variety of purposes.

Figure 1:
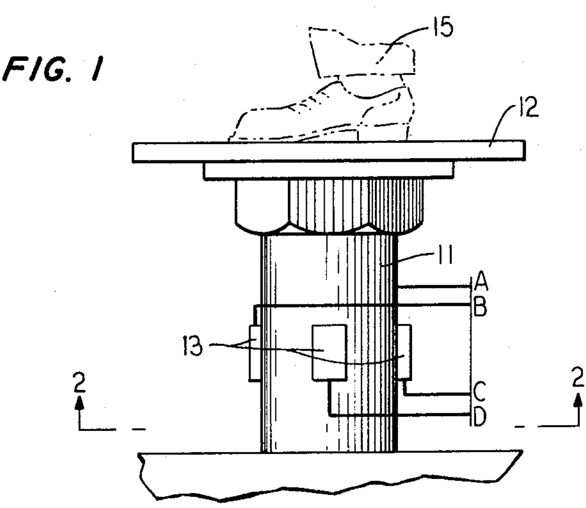
FIG. 1 is an elevation view of apparatus for measuring human reactions in accordance with this invention.

Referring to FIG. 1, measuring apparatus is illustrated which includes a column 11, a platform 12, sensors 13 and leads A, B, C and D leading to a display device 14. All of these components cooperate to to measure and record the reactions of a human test subject 15.

The column 11 is conveniently made of steel and has a cross section determined by the sensitivity of display. A cross section of 1 inch, however, has produced useful results. As illustrated in FIG. 1, the column 11 is mounted as cantilever. That is, one end is fixed and the other is free to deflect when subjected to a bending load. In the embodiment disclosed, the fixed end is welded to a steel support base.

The platform 12 is also conveniently made of steel and is rigidly attached to the free end of the column 11 in any convenient way as, for example, by a threaded nut as illustrated in FIG. 1. It is designed to support the test subject 15, so it must be relatively sturdy. A square about 12 inches on a side and three-eighths of an inch thick has proved suitable.

Figure 2:
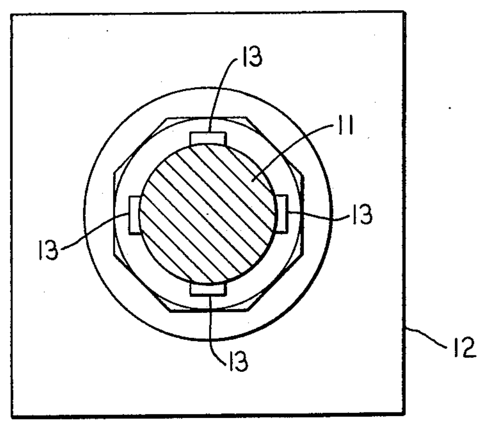
FIG. 2 is a bottom plan view taken in section along the lines 2—2 in FIG. 1 of the apparatus shown in FIG. 2.

The sensors 13 are strain gauges. Any readily available type is suitable. It is only necessary that each strain gauge be designed to respond proportionally to deflections of the column 11. As illustrated in FIG. 1 and 2, four strain gauges are spaced 90° apart around the periphery of the column 11. Each is firmly attached to the column 11 as, for example, by being cemented in place.

The output from each sensor 13 is wired to a comparator 16. The comparator 16, when used, synthesizes the signals generated by the sensors 13 and then transmits them to the display device 14. For example, sensors 13 spaced 180° apart can be joined to each other to form two sensor pairs. The output from each pair can then be delivered directly to the display device 14 or it can be first amplified by the comparator 16.

If highly precise measurements are needed, a double set of sensors 13 can be employed. In that situation, a second sensor 13 is added to the column 11 just above each of those shown to form a second ring of four sensors. By pairing adjacent sensors on opposite rings (that is, upper and lower sensors) and then combining them as opposite legs of an electrical bridge, the accuracy from sensors diametrically opposed on the column 11, e.g., spaced 180° apart from each other) will be substantially improved.

The display device 14 is a standard *x–y* recorder or other read-out equipment such as an oscilloscope.

In operation, the apparatus disclosed measures and records the rate and magnitude of variations between the center of gravity of the test subject 15 and the longitudinal axis of the column 11. Measurement begins by positioning the test subject 15 on the platform 12. The test subject 15, as does every human, constantly adjusts for balance changes. A balance change, as the term is used herein, simply means a shift in the center of gravity away from a neutral position. Balance changes are compensated for by returning the center of gravity to its initial or neutral position.

Figure 3:
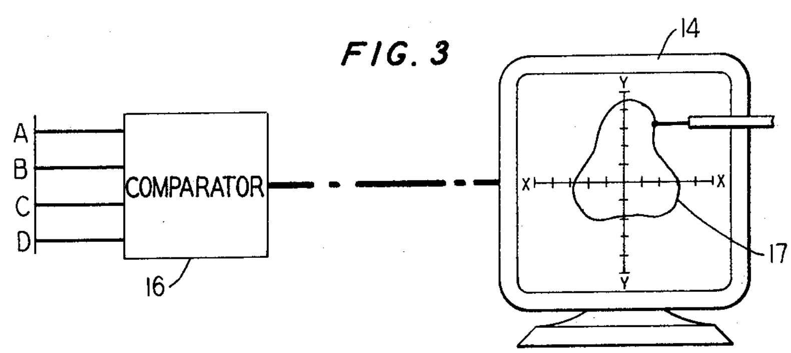
FIG. 3 illustrates, in schematic form, display apparatus for accepting signals from the sensors illustrated in FIGS. 1 and 2.

When the test subject 15 stands on the platform 12, changes in his center of gravity and corrections thereof cause the column 11 to deflect. As the column 11 deflects, the sensors 13 are energized. Thereafter, the output of the sensors 13 is delivered to the display device 14 through the comparator 16, if used. Lastly, the output of the sensors 13 is recorded by the display device 14. The display recording as illustrated in FIG. 3, is a polar presentation or trace 17 which takes the shape of a rosette. The rosette recording (the area it covers) is a measure of the phase delay between action and reaction. This is sometimes referred to as reaction time and is sensitive, for example, to the absorption of various drugs by a test subject under observation.

While it is helpful that the test subject 15 align his center of gravity with the central axis of the column 11 at the beginning of the test, it is not essential for valid results. The misalignment between the two merely shifts the location of the trace 17 on the axes of the display device 14.

Similarly, in order to measure reaction to a specific disturbance one side of the platform may be raised a specific amount so that it is out of level by a few degrees. A person standing on such a platform can easily adjust himself to such a small inclination. After the person is at ease and the recording is in progress, the base will be dropped to a level position within a fraction of a second. The subject will attempt to regain his balance and the recorded recovery pattern will also reveal reaction characteristics.

Still another approach to the investigation of reaction phenomena is to process the output of the tranducers. For instance, the first derivative of the output giving the rate of displacement is an indication of the muscular force developed to maintain balance.

In summary, a technique has been described by which human reactions can be quickly and readily measured and recorded. While only one embodiment of the invention has been disclosed, it will be understood that the disclosed embodiment is only illustrative of the principles of the invention and other embodiments will occur to those skilled in the art which fall within the scope of the invention.

I claim:

1. Apparatus for measuring and recording human reaction time including a support for locating the center of gravity of a test subject in a predetermined position with respect to a vertically disposed reference axis and a recorder means for generating indicia proportional to the amount and direction the center of gravity of said subject deviates from said position and the amount of time required for the subject to return his center of gravity to said position characterized in that said support comprises a platform of a size to allow a normal adult human to be supported thereon, said platform being attached to the free end of a single cantilever mounted vertically disposed column, said column being supported only at its base such that said column may deflect upon deviation of the center of gravity of said subject from said predetermined position, and said recorder means includes deflection responsive sensor means and display means, said sensor means being distributed around the periphery of said column and being arranged to produce an output upon deflection of said column, said display means being connected to said sensor means and including means for recording outputs from said sensor means in a permanent form.

2. Apparatus in accordance with claim 1 wherein said sensor means are strain gauges distributed symmetrically around the periphery of said column and said vertical axis passes longitudinally through the center of said vertically disposed column.

3. Apparatus in accordance with claim 1 wherein said column is a steel cylinder and said sensor means are strain gauges spaced 90° apart around the circumference of said cylinder.

4. Apparatus in accordance with claim 1 wherein said display device is an $x-y$ recorder.

5. Apparatus in accordance with claim 1 wherein said column projects upwardly from and is supported by a floor mounted support, and said platform provides a surface for supporting said subject in an upright position.

6. In apparatus for measuring and recording the magnitude of human reactions, the combination comprising:

a deflectable column mounted as a vertically disposed cantilever;

platform means for supporting the center of gravity of a test subject on the free end of and in a predetermined position with respect to the longitudinal axis of said column, said platforms means being of a size to allow a normal adult human to be supported thereon, and said column being supported only at its base such that said column may deflect upon deviation of the center of gravity of said subject from said predetermined position;

sensor means for generating outputs proportional to and in response to deflections imparted to said column by movement of the center of gravity of said test subject, and display means for displaying and recording the outputs generated by said sensors.

7. The combination in accordance with claim 6 wherein said display means includes an $x-y$ recorder.

8. In a method for measuring human reaction time, the steps comprising:

aligning the center of gravity of a test subject in a predetermined position with respect to a reference axis passing through a vertical column;

measuring the rate and magnitude said center of gravity deviates from said reference axis, and recording said deviations with a recording device for later examination or comparison with other similar recordings.

9. The method in accordance with claim 8 wherein said test subject is positioned with his center of gravity intersected by said reference axis.

10. The method in accordance with claim 8 wherein said reference axis is vertical with respect to the earth.

* * * * *